(12) United States Patent
Rustad et al.

(10) Patent No.: US 7,366,790 B1
(45) Date of Patent: Apr. 29, 2008

(54) SYSTEM AND METHOD OF ACTIVE LATENCY DETECTION FOR NETWORK APPLICATIONS

(75) Inventors: Joseph V. Rustad, San Diego, CA (US); Gary Kaiser, San Jose, CA (US); Leslie L. Murphy, West Bloomfield, MI (US); Robert C. Mills, San Diego, CA (US); Matthew J. Snyder, San Diego, CA (US); George D. Lin, San Diego, CA (US)

(73) Assignee: Compuware Corporation, Detroit, MI (US)

( * ) Notice: Subject to any disclaimer, the term of this patent is extended or adjusted under 35 U.S.C. 154(b) by 825 days.

(21) Appl. No.: 10/625,943

(22) Filed: Jul. 24, 2003

(51) Int. Cl.
*G06F 15/173* (2006.01)
(52) U.S. Cl. ............... 709/235; 370/229; 370/232; 709/234
(58) Field of Classification Search ........... 709/223, 709/224, 203, 235, 233, 234; 370/503, 411, 370/231, 234, 235, 238, 242, 233, 229, 232; 702/187; 717/128
See application file for complete search history.

(56) References Cited

U.S. PATENT DOCUMENTS

| | | | |
|---|---|---|---|
| 5,935,249 A | 8/1999 | Stern et al. | |
| 6,470,378 B1 | 10/2002 | Tracton et al. | |
| 6,507,805 B1 | 1/2003 | Gordon et al. | |
| 6,513,060 B1* | 1/2003 | Nixon et al. | 709/203 |
| 6,513,155 B1 | 1/2003 | Alexander, III et al. | |
| 6,546,548 B1 | 4/2003 | Berry et al. | |
| 6,553,564 B1 | 4/2003 | Alexander, III et al. | |
| 6,598,012 B1 | 7/2003 | Berry et al. | |
| 6,763,380 B1* | 7/2004 | Mayton et al. | 709/224 |
| 6,922,417 B2* | 7/2005 | Vanlint | 370/503 |
| 2004/0153534 A1* | 8/2004 | Gibart et al. | 709/223 |

* cited by examiner

*Primary Examiner*—Frantz B. Jean
(74) *Attorney, Agent, or Firm*—Fenwick & West LLP

(57) ABSTRACT

A system and method of active latency detection for network applications that allows network latency to be calculated from a single host system. Periodic requests are generated from the host system and directed to a remote system in a way that requires minimal processing by the remote system. Latencies are calculated from the timing information associated with the periodic requests and can be combined with timing information associated with application packets to generate a latency trace for one or more network applications.

26 Claims, 14 Drawing Sheets

1200

1300

SYSTEM AND METHOD OF ACTIVE LATENCY DETECTION FOR NETWORK APPLICATIONS

BACKGROUND OF THE INVENTION

1. Field of the Invention

The invention relates to the field of network application monitoring and, more specifically, systems and methods for measuring client, network, and server times from a single source.

2. Description of the Related Art

An accurate picture of client, network, and server times is highly desirable for managing systems that rely on network applications. Such performance analysis allows administrators to identify bottlenecks and allocate resources to improve performance. However, identifying whether latency is caused by the client system, the network, or the remote server can be difficult using a single source.

FIG. 1 shows an example exchange between a local node 110 and a remote node 120 for a network application. The client portion of the network application generates 130 a request. There is a local time delay before the request is actually sent 132 into the network. There is a network time delay before the request is actually received 134 by the remote node 120. There is remote processing time and delays before the remote node 120 sends 136 a response. There is another network time delay before it is received 138 by the local node and still another local time delay before the response is processed 140. This is particularly problematic because the local node 110 has no direct timing data other than the time at which the application request was generated 130 and processing 140 begins. The local time delays represent self-queuing delays based upon the backlog of outgoing and incoming packets at the local node and the outgoing and incoming bandwidth. The network time delays reflect network latency that results from the length of available routes, congestion, failures, intermediate node processing times, and other network delays. The network time delays may not be the same at the time the request is sent 132 and the time the response is sent 138. The remote time delay is a black box that includes queuing delays at the remote node, actual application processing time, and other delays. From the perspective of the local node 110 as a single packet source, there is no direct way to separate the network time delay from the remote time delay at the remote node.

Two prior methods of dealing with this problem have been 1) to use multiple sources, merging the data from at least two different local nodes, and 2) to manually provide the latency and bandwidth to compensate for transit times.

Merge: The merge method involves taking two packet traces of the same transaction and combining them to get the transit times for each packet. The two traces are located at opposite ends of the network, and each packet is seen twice (once by each trace). The difference between the two times is the transit time. The negative aspect of this method is that it can be difficult to deploy two capture agents.

Manual Adjustment: Manual adjustment asks a human to enter the latency and bandwidth to a node. It then uses this information to compute transit times. The negative aspects of this method include the requirement of human input and the oversimplification of latency by specifying a single number instead of a varying latency curve.

There is a need for a system and method for calculating network latency from a single local or host node.

SUMMARY OF THE INVENTION

Systems and methods of active latency detection for network applications are disclosed. Active latency detection allows network latency to be calculated from a single host system. Periodic requests are generated from the host system and directed to a remote system in a way that requires minimal processing by the remote system. For example, the periodic requests may be directed to a port at the remote node that has been identified as closed, causing the request to be denied with minimal processing. The timing information for the requests and responses is stored for use in further processing. Network latencies are calculated from the timing information associated with the periodic requests and can be combined with timing information associated with application packets to generate a latency trace for one or more network applications.

BRIEF DESCRIPTION OF THE DRAWINGS

These and other features of various embodiments of the invention are more fully described below. Reference is made through the description to the accompanying drawings, in which.

DETAILED DESCRIPTION OF THE INVENTION

Figure 1:
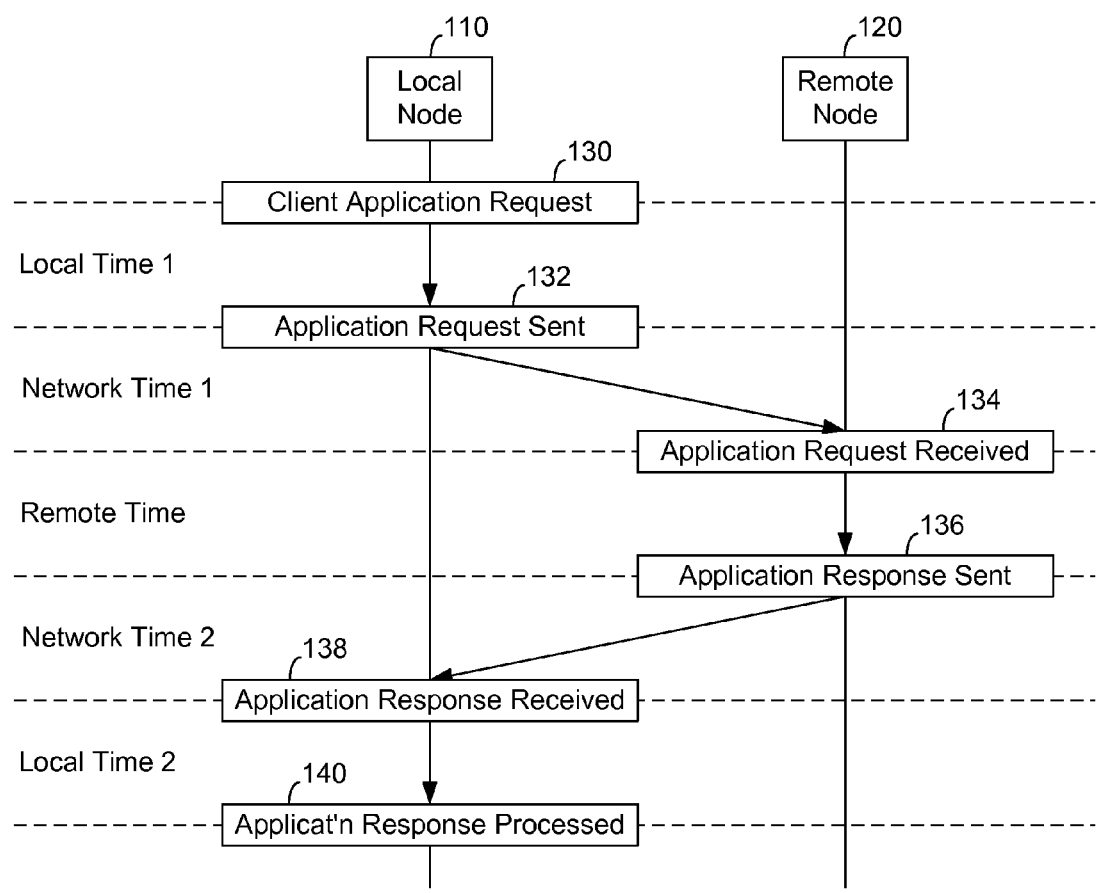
FIG. 1 is a diagram of an example application packet exchange between a local node and a host node indicating sources of latency.
Figure 2:
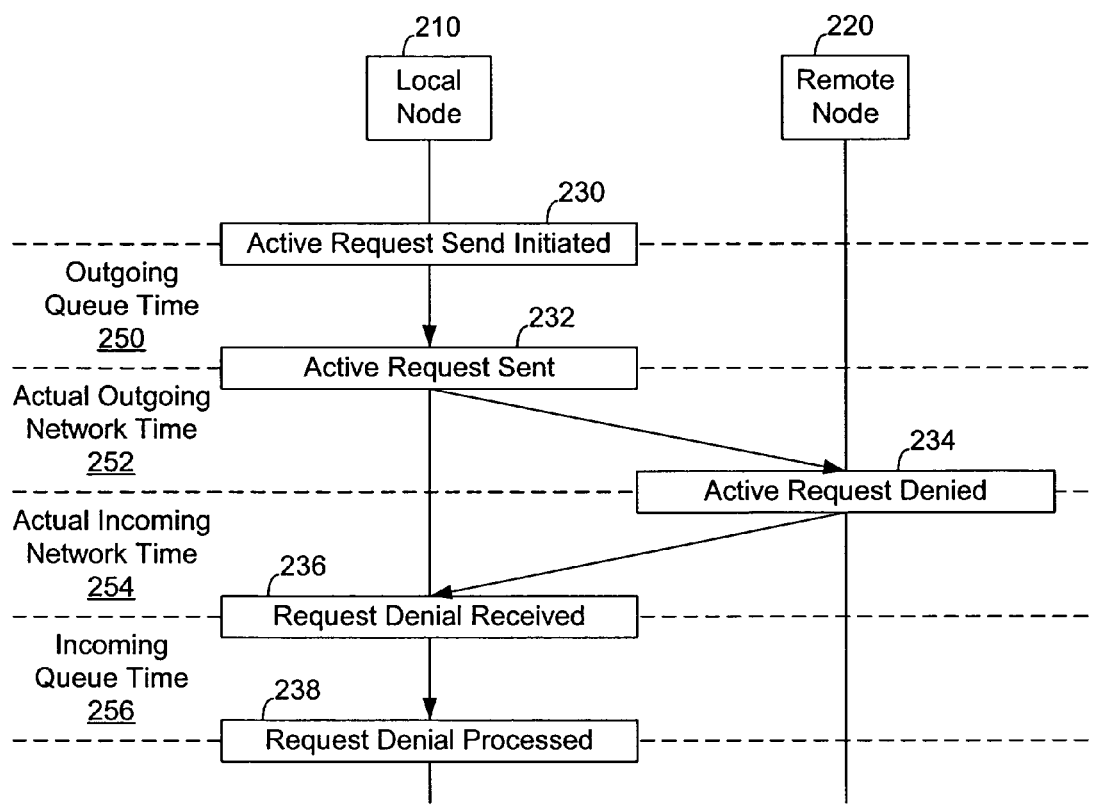
FIG. 2 is a diagram of an active request for use in active latency detection.

FIG. 2 shows the use of an active request to determine the local node queuing and network components of network application latency. Calculation of the local node and network components also enables calculation of remote node latency based upon comparison with application packet data. The local node 210 is the node generating the active request, such as a client computer system, workstation, or other computing resource. The remote node 220 receives and responds to the active request. The remote node 220 is a remote computing resource, such as a server, that is in communication with the local node 210 via a network.

An active request is a network request from the local node 210 to the remote node 220. Active requests are made on a periodic basis in association with a running application and a particular remote node or IP address. The active requests are calculated to generate a response by the remote node with minimal processing, thus minimal remote node time. Even TCP/IP connection requests and ICMP ping requests may require processing by the remote node 220 that increases response time. Further, ICMP ping requests are regarded as low priority traffic and may not be subject to the same latencies as an application request. One method of minimizing remote node processing times is to address a TCP connection request to a port that is typically or known to be closed. For example, the connection request could be addressed to port known by the provider to be closed in standard configurations. In one embodiment, an initial connection request is sent to a port that is expected to be closed to verify that that is indeed the case. Error handling or a list of additional ports to attempt may also be provided. The generation of a response to a request to a closed port is among the fastest actions a server can execute in response to an incoming packet.

There is a delay between the time at which the local node 210 initiates 230 the process of sending an active request and the active request actually being sent 232 from the node, leaving the node and entering the network. This local node latency primarily reflects an outgoing queue time 250. The outgoing queue time is the time that a message spends in the queue or stack awaiting sending. Due to the limited capacity of the connection between the local node 210 and the network, all messages may not be able to be sent instantly and will instead wait in a queue. The outgoing queue time 250 will be minimal in systems where the communication needs of the local node 210 do not exceed the capacity available in its network connection.

Between the time at which the active request is sent 232 and the active request is received and denied 234 is the outgoing network time 252. Between the time the request is denied 234 and the request denial is received 236 is the incoming network time 254. These network times reflect the network latency.

Similar to the outgoing queue time 250, there is an incoming queue time 256. This local node latency reflects the time between the receipt 236 of the request denial at the local node 210 and actual processing 238 of the request denial. The incoming queue time is the time that a message spends in the queue or stack awaiting processing.

Figure 3:
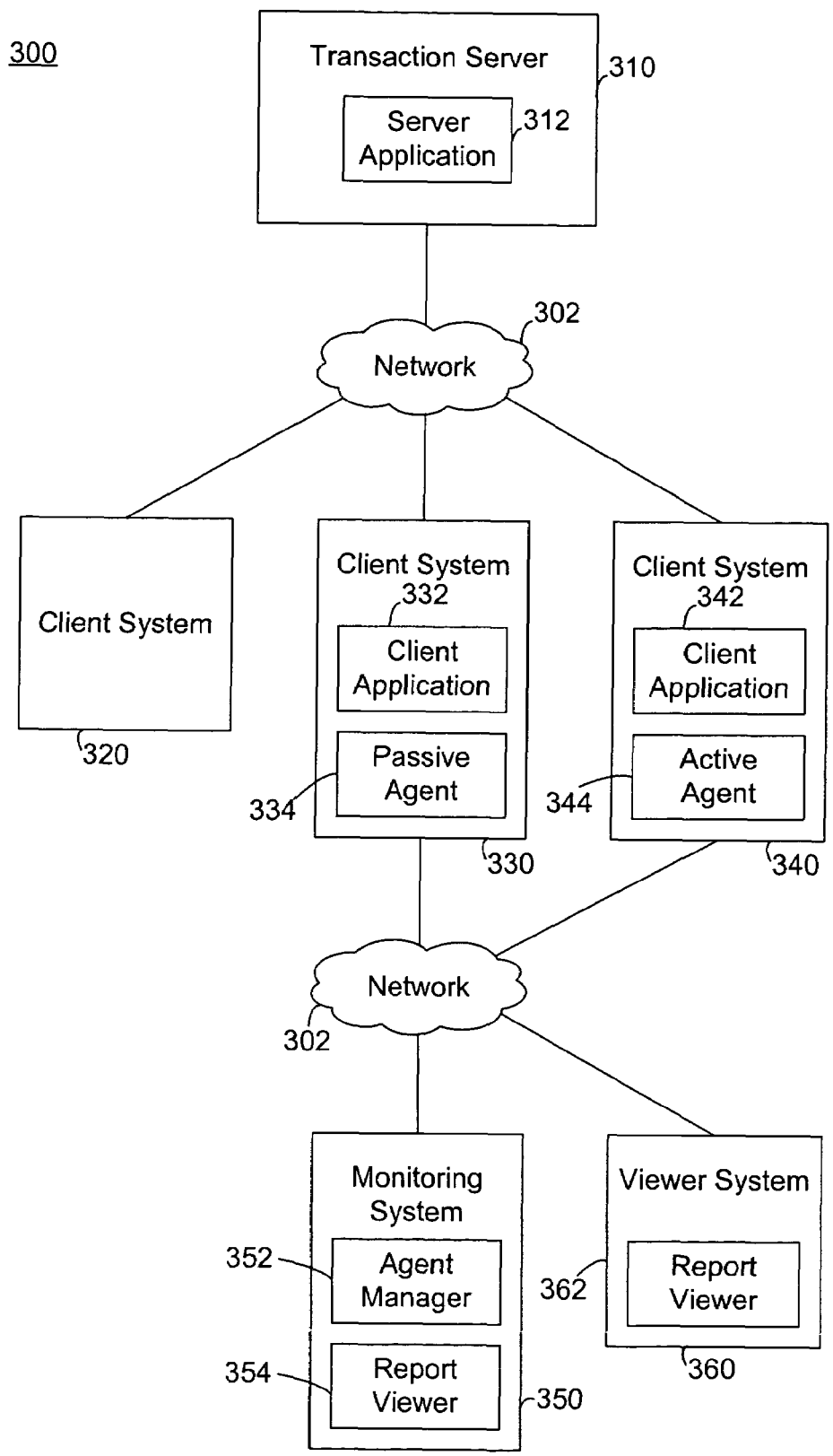
FIG. 3 is a block diagram of an example system in which active latency detection may be implemented to analyze network application performance.

FIG. 3 shows a block diagram of an example system 300 in which active latency detection may be implemented. The system 300 includes a plurality of computer systems interconnected by one or more networks 302. The computer systems embodying system 300 include a transaction server 310, several client systems 320, 330, and 340, and the administrative systems, monitoring system 350 and viewer system 360. Each of these computer systems may be embodied in a variety of conventional hardware and software. For example, the computer systems may include mainframes, minicomputers, microcomputers, personal computers, portable computers, handheld computers, mobile telephones/pagers/communicators, embedded devices, or other computer systems. Any computer system that includes a memory, microprocessor, communication channel, and appropriate software may implement all or part of one or more of the component systems of the system 300. In one embodiment, the transaction server 310 is implemented in a server system, such as a mainframe or rack server, and the remaining systems are implemented in personal computers.

The transaction server 310 includes a server application 312. The server application 312 is a computing resource that supports one or more client applications. The transaction server 310 provides access to the server application 312 using conventional network and application protocols for a client/server architecture. The transaction server 310 supports one or more client applications on remote client systems.

The client systems 320, 330, and 340 represent three example client system configurations that may interact with the server application 312. The client system 320 includes a client application 322 that communicates with the server application 312. The client system 320 is a standard production client system within a client/server architecture and does not include any additional components for application or network performance monitoring. The client system 330 also includes a client application 332 that communicates with the server application 312. However, the client system 330 includes an additional component for monitoring application or network performance. The client system 330 includes a passive agent 332. The passive agent 332 monitors network and application performance on a production client computer. The client system 330 is a production system used in conducting whatever business or transactions are embodied in the client application 332. The passive agent 332 monitors the client application's 332 performance as it is used. The client system 340 also includes a client application 342 and an additional monitoring component. The monitoring component in the client system 340 is an active agent 344. The active agent 344 differs from the passive agent 334 in that it actual uses the client application 342 to execute specific test transactions for it to monitor. The client system 340 including the active agent 344 is most commonly not a production computer, as the test transactions would use resources needed by production systems for production transactions. Note that the active/passive agents should not be confused with the concept of active latency detection. In one embodiment, both active agent 344 and passive agent 334 implement active latency detection for use in monitoring transactions from their client systems 330 and 340.

The system 300 also includes administrative components that allow aggregation and oversight of the monitoring operations of the client systems 320, 330, and 340. The monitoring components include the monitoring system 350 and the viewer system 360. The monitoring system 350 includes an agent manager 352 and a report viewer 354. The agent manager 352 oversees operation of monitoring agents within the system 300, such as the passive agent 334 and the active agent 344. The agent manager 352 collects data from the passive agent 334 and the active agent 344 over the network 302. The agent manager 352 may also issue commands or preferences to the monitored agents in order to influence their operation, such as the type and frequency of data collection or, for the active agents, the types of transactions initiated. The report viewer 354 provides a report generation and interface module for viewing the monitoring data. The report viewer 354 may be integrated with the agent manager 352. The viewer system 360 simply enables a remote report viewer 362.

Figure 4:
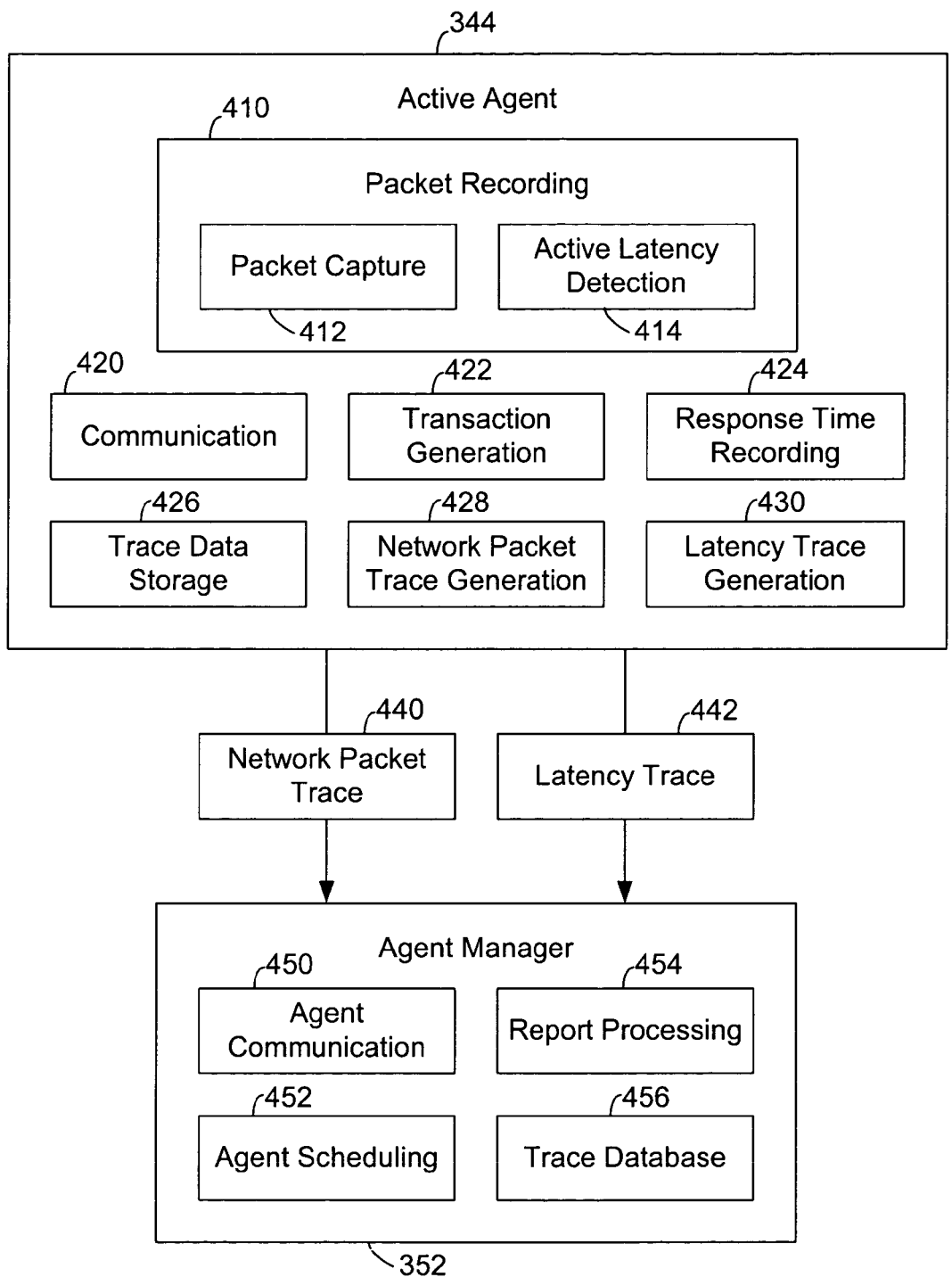
FIG. 4 is a block diagram of an active agent and agent manager implementing active latency detection.

FIG. 4 shows a more detailed view of the active agent 344 and the agent manager 352, in communication with one another as part of a system, such as system 300 of FIG. 3.

As shown and described above, the active agent 344 and the agent manager 352 may be implemented on a variety of computer hardware, such as servers or personal computers. In one embodiment, the active agent 344 and the agent manager 352 are software components loaded on general purpose computer devices interconnected through a network, such as a LAN or WAN.

The active agent 344 operates in conjunction with a client application to generate and monitor network transactions using the client application. A single active agent may monitor a large number of transactions including: multiple transaction threads for a single client application that interacts with one or more remote network applications, or multiple client applications (that may or may not interact with multiple remote network applications). While the active agent 344 is described with regard to single application monitoring, it is understood that the active agent 344 may be configured to manage multiple transaction generation and monitoring threads.

The active agent 344 includes a packet recording module 410, a communication module 420, a transaction generation module 422, a response time recording module 424, a trace data storage module 426, a network packet trace generation module 428, and a latency trace generation module 430. The packet recording module 410 provides logic for recording packets received by the system hosting the active agent 344. The packet recording module 410 includes a packet capture module 412 and an active latency detection module 414. The packet capture module 412 receives all IP packets received by the system hosting the active agent 344 and determines which packets should be logged or handled by the active agent 344. The active latency detection module 414 generates active requests, receives responses from the packet capture module 412, and logs and generates trace data for the request/response pairs.

The communication module 420 provides logic for communicating with the agent manager 352. Communications include both sending trace related data to the agent manager 352 and receiving scheduling and instructions from the agent manager 352. The transaction generation module 422 provides logic for generating transactions through one or more associated client applications. The response time recording module 224 provides logic for recording the elapsed time between sending an active request and receiving a response to that active request. The trace data storage module 426 stores the trace data, including the send times, receive times, and elapsed times for a series of active requests and one or more monitored client applications. In one embodiment, the trace data storage module 426 stores one or more latency curves generated by the active latency detection module 414. The network packet trace generation module 428 generates a network trace for the monitored client applications based upon application trace data. The latency trace generation module 430 generates a latency trace based upon the latency and application trace data. In one embodiment, the latency trace generation module 430 includes logic for adjusting the packet data from the application trace for a select period with a select remote node based upon a corresponding latency curve generated by the active latency detection module 414.

The active agent 344 uses communication module 420 to communicate network packet traces 440 and latency traces 442 to the agent manager 352. Communications may be made on a periodic basis or may be made upon request from the agent manager 352. The network packet traces 440 include conventional application packet traces based upon packet send and receive times and other packet monitoring data. For example, each network packet trace may correspond to all packets sent and received regarding a particular transaction. The latency traces 442 include network latency data between the system hosting the active agent 344 and one or more remote nodes. The latency traces 442 are network packet traces corrected for network latency using active latency trace data. In an alternate embodiment, trace data, including application trace data and active latency trace data, is communicated in an unprocessed state to the agent manager 352. In this alternate embodiment, the network packet trace generation module 428 and the latency trace generation module 430 are located in the agent manager 352 rather than the active agent 344.

The agent manager 352 oversees operation and aggregates data from one or more active agents, such as the active agent 344. The agent manager 352 may also oversee operation and aggregate data from passive agents and other trace data sources. The agent manager 352 includes agent communication module 450, agent scheduling module 452, report processing module 454, and trace database module 456. The agent communication module 450 receives trace data communicated from the active agent 344 and sends scheduling and instruction messages to the active agent 344. The agent scheduling module 452 coordinates the operation of multiple active agents. For example, the agent scheduling module 452 may provide transaction scripts and schedules to the active agent 344 and coordinate communication of trace data. The report processing module 454 generates network trace reports based upon trace data received from the active agent 344. The reports generated may be customizable by the user, based upon different data aggregation and visualization selections. The trace database module 456 stores all trace data received by the agent manager 352 from the active agents 344. The trace database module 456 provides the data used by the report processing module 454 to generate reports.

Figure 5:
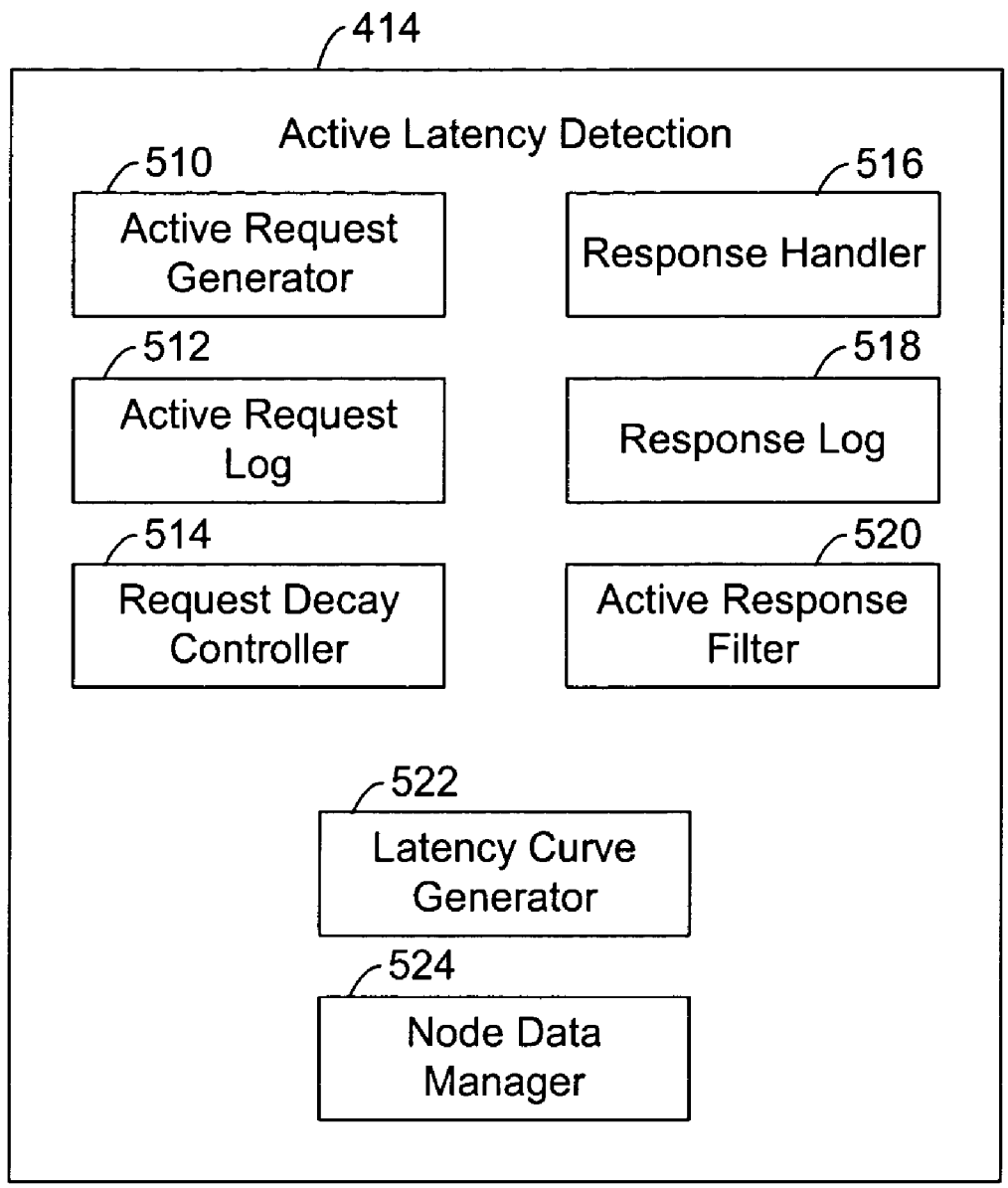
FIG. 5 is a block diagram of an active latency detection module, such as the active latency detection module shown in FIG. 4.

FIG. 5 shows a more detailed view of the active latency detection module 414. The active latency detection module 414 may be implemented as part of a agent module for gathering trace data or in other implementations where generation of network latency data from a single location is desirable. The active latency detection module 414 is integrated with packet capture such that it receives notification of all new packets received by the host system. A new thread for monitoring a remote node is initiated with each new node address that is received. The active latency detection module 414 includes an active request generator 510, an active request log 512, a request decay controller 514, a response handler 516, a response log 518, an active response filter 520, a latency curve generator 522, and a node data manager 524.

The active request generator 510 initiates periodic requests to remote nodes. The active request generator 510 generates an active request to each remote node involved in transactions with the monitored client applications. In one embodiment, the active requests are TCP connection requests addressed to closed ports at the remote nodes. Multiple active requests may be sent to the same remote node at the same time. For example, active requests may be sent in groups of three to provide more robust data points. The period between by the active requests to each remote node is based upon a request rate. In one embodiment, these active request rates are specific to each remote node and are decayed by the request decay controller 514.

The active request log 512 records the time at which the periodic requests are initiated by the active latency detection module 414. The active request log 512 includes identifiers or structure to separate active requests directed to different remote nodes. In one embodiment, the active request log 512 includes identifiers to allow the requests to be correctly paired with later received responses.

The request decay controller 514 provides for decaying the rate at which active requests are sent to a remote node dependent upon application related responses from a given remote node. In one embodiment, the request decay controller 514 includes a rate variable associated with each remote node involved in monitoring. The rate variable is assigned an initial value that decays each time an active request (or group of active requests) is sent (at intervals equal to the current value). For example, each time a group of active requests are sent, the rate variable may decay 20%, increasing the interval until the next group will be sent. When an application packet (not an active request response) is received from a remote node or sent to a remote node, the rate variable for that node is reset to the initial value. Decaying the rate of active requests prevents unnecessary traffic and processing associated with a remote node that is rarely or no longer being used by any of the client applications.

The response handler 516 receives all packets that have been received by the host node and identifies those that are responses to the active requests. Information regarding the identified responses is stored in the response log 518. Like the active request log 514, the response log 518 includes data identified or organized by remote node address. The active response filter 520 removes the responses and allows other packets (application packets) to be passed on for normal processing by the system.

The latency curve generator 522 uses the information stored in the active request log 514 and the response log 518 to generate a latency curve. The latency curve generator 522 is described below with regard to FIG. 6.

The node data manager 524 oversees the management of multiple processing entries for multiple remote node addresses. The node data manager 524 maintains entries for each remote node address and verifies whether or not a packet corresponds to an existing remote node address or requires a new entry. The node manager 524 initiates and manages variables for each remote node address, such as identifier, state, request rate, and time to next active request.

Figure 6:
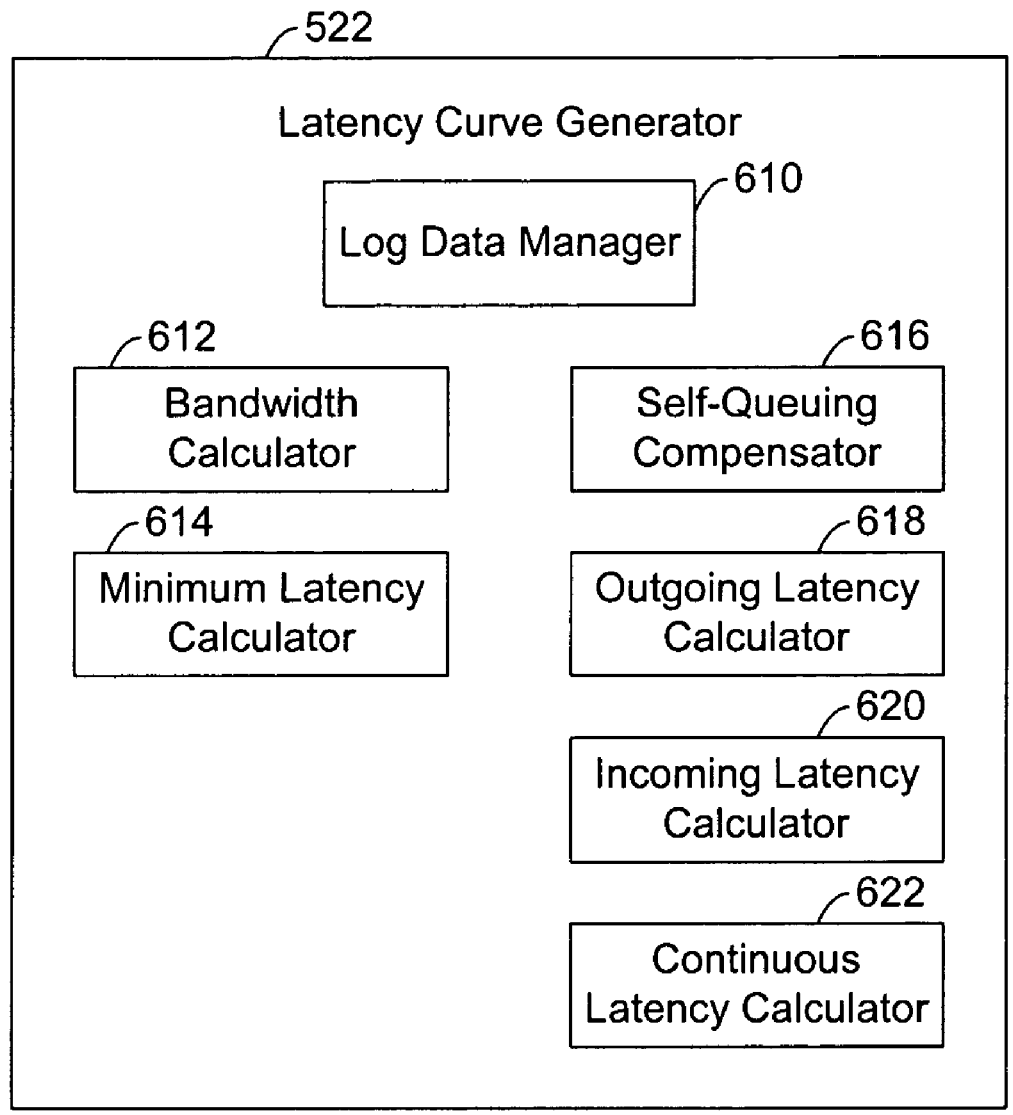
FIG. 6 is a block diagram of a latency curve calculator, such as the latency curve calculator shown in FIG. 3.

FIG. 6 shows further detail of the latency curve generator 522. The latency curve generator 522 includes a log data manager 610, a bandwidth calculator 612, a minimum latency calculator 614, a self-queuing compensator 616, an outgoing latency calculator 618, an incoming latency calculator 620, and a continuous latency calculator 622. The log data manager 610 utilizes information stored in the active request log 514 and the response log 518 in order to identify request/response pairs and select data series for generation of latency curves. The bandwidth calculator 612 calculates the available bandwidth for communication with the remote node. In one embodiment, the bandwidth calculator 612 calculates both the burst bandwidth and the roundtrip bandwidth to each remote node for which a latency curve is to be calculated. The minimum latency calculator 614 determines a minimum latency value to be used in further calculations. For example, one method of calculating the minimum latency is by identifying the shortest roundtrip in the data set being used for the calculation and halving it. The self-queuing compensator 616 operates on the selected data sets to compensate for queuing at the host node. The self-queuing compensator 616 uses the bandwidth limitations calculated by the bandwidth calculator 612 to determine the self-queuing effects on the roundtrip latency. The outgoing latency calculator 618 generates a latency curve for the data points corresponding to outgoing packets. The incoming latency calculator 620 generates a latency curve for the data points corresponding to incoming packets. The continuous latency calculator 622 integrates the incoming and outgoing latency curves into a single continuous latency curve. The continuous latency calculator 622 includes logic for handling sudden drops between data points in the resulting combined curve.

Figure 7:
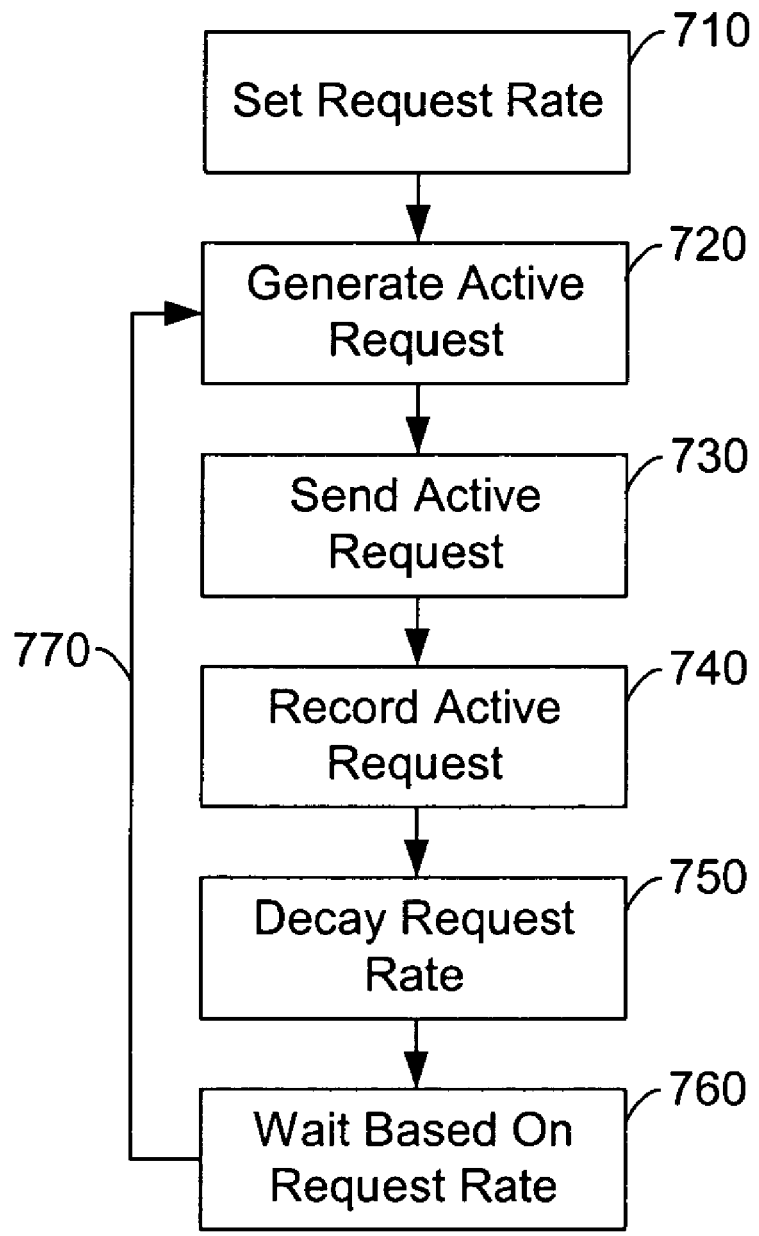
FIG. 7 is a flow diagram of a method of managing the generation of active requests for active latency detection.

FIG. 7 shows a method 700 of managing the generation of active requests. In one embodiment, the active latency detection module 414 implements the method 700. For example, the method 700 may be implemented when an application packet with a new remote node address is received by the packet capture module 412 and identified by the node data manager 524 (see FIG. 8, described below). A starting request rate is set 710 for the active requests. For example, the node data manager 524 may initiate and assign a value for the request rate along with other variables for overseeing the active requests related to the identified remote node. An active request is generated 720. For example, the active request generator 510 may initiate an active request to be sent from the host system to the identified remote node. In one embodiment, a plurality of active requests are generated, such as a group of three. The active requests are queued and sent 730 from the host system to the identified remote node. The times of the active requests sent are recorded 740. For example, the active request generator 510 may record the timestamp, packet size, and other identifying information in the active request log 512. The request rate is decayed 750. For example, the request decay controller 514 may decay the request rate by a defined decay rate, such as twenty percent. The system waits 760 based upon the request rate. For example, the node data manager 524 may maintain an elapsed time from the previously sent active requests for the identified remote node and compare that elapsed time against the current request rate. The system returns 770 to generating 720 active requests when the wait time has elapsed. The system may implement a minimum request rate at which active requests are no longer sent unless the request rate is reset (see FIG. 8, described below).

Figure 8:
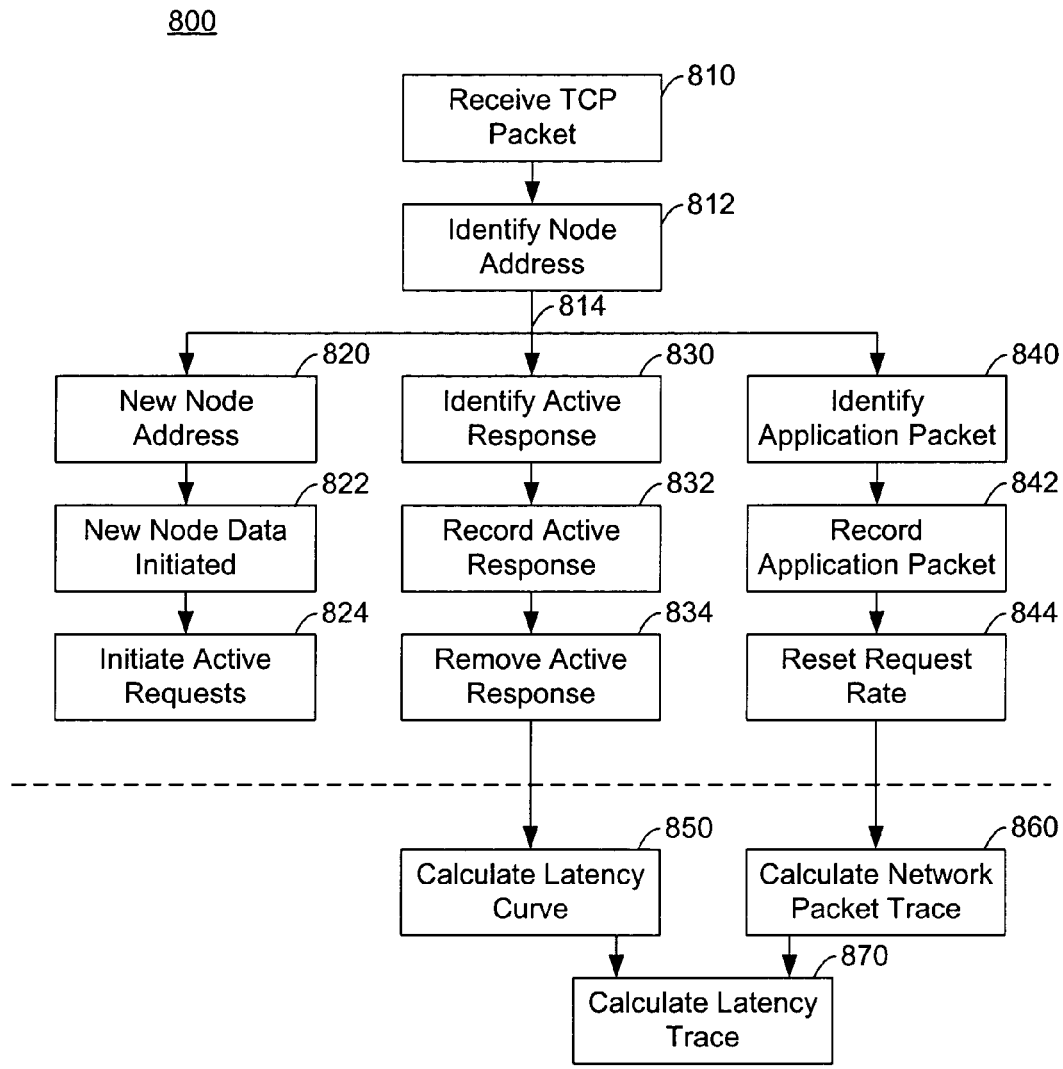
FIG. 8 is a flow diagram of a method of managing the receipt of data packets for active latency detection.

FIG. 8 shows a method 800 of managing the receipt of data packets for active latency detection. In one embodiment, the method 800 is implemented in a system with the active latency detection module 414 and modules for handling application data packets, such as the response time recording module 424 and the trace data storage module 426. The method 800 also includes options for using the gathered trace data below the dotted line 802. A TCP packet is received 810. For example, as TCP packets are received by the host system they are captured by the packet capture module 412. The remote node address of the received TCP packet is identified 812. For example, the packet capture module 412 may read the sending address from the packet header. The remote node address is evaluated 814 to determine further processing. For example, the packets may be passed to the latency detection module 414 for comparison against the list of remote nodes maintained by the node data manager 524. A new remote node address for an application packet may be identified 820, an active request response may be identified 830, or an application packet to a previously identified remote node address may be identified 840.

If a new remote node address is identified 820, the system initiates a process for monitoring traffic to and from the new remote node address. New node management data is initiated 822 for the identified remote node. For example, the node data manager 524 may add the remote node address to the list of remote nodes monitored and initiate related values, such as identifier, request rate, log allocations, and timer values. Active requests to the newly identified remote node are initiated 824 (see FIG. 7, described above). The application packet from the new remote node address is passed on to the system for normal processing by the intended recipient, such as the monitored client application.

If the response to an active request is identified 830, the system initiates a process for collecting response data to be used for calculating latency curves and traces. The response to the active request is recorded 832. For example, the response handler 516 may record information regarding the received response in the response log 518. The response to the active request is removed 834. For example, the active response filter 520 removes the response packet from the stack of packets that are to be processed normally by the system. In this way, the normal processing stack is not cluttered or slowed by the receipt of the responses to active requests.

If the packet is identified 840 as an application packet from a remote node already known to the system, the system initiates a process for collecting trace data and resetting the request rate. The application packet is recorded 842. For example, the response time recording module 424 may record information regarding the application packet to the trace data storage module 426. The request rate is reset 844. For example, the current request rate, at whatever value it has decayed to (see FIG. 7, described above), is reset to the starting request rate by the node data manager 524. The application packet is processed as normal by the system.

The trace data generated by the method 800 may be used to generate various kinds of latency and trace reports. For example, a latency curve may be calculated 850, a network packet trace may be calculated 860, and a latency trace may be calculated 870. The latency curve may be calculated 850 using data from active requests and their responses. For example, a latency curve may be generated by the latency curve generator 522 based upon data from the active request log 512 and the response log 518 for a particular remote node and interval of time. Calculation 850 of a latency curve is further described in relation to FIGS. 9-12, below. The network packet trace may be calculated 860 using data from application data packets sent and received using conventional network packet trace calculation techniques. For example, the network packet trace may be calculated 860 by the network packet trace generation module 428 using the application packet send and receive data recorded in the trace data storage 426. The latency trace may be calculated 870 based upon the network packet trace or its underlying application trace data and the latency curve. Calculation 870 of the latency trace is further described with regard to FIG. 13, below.

Figure 9:
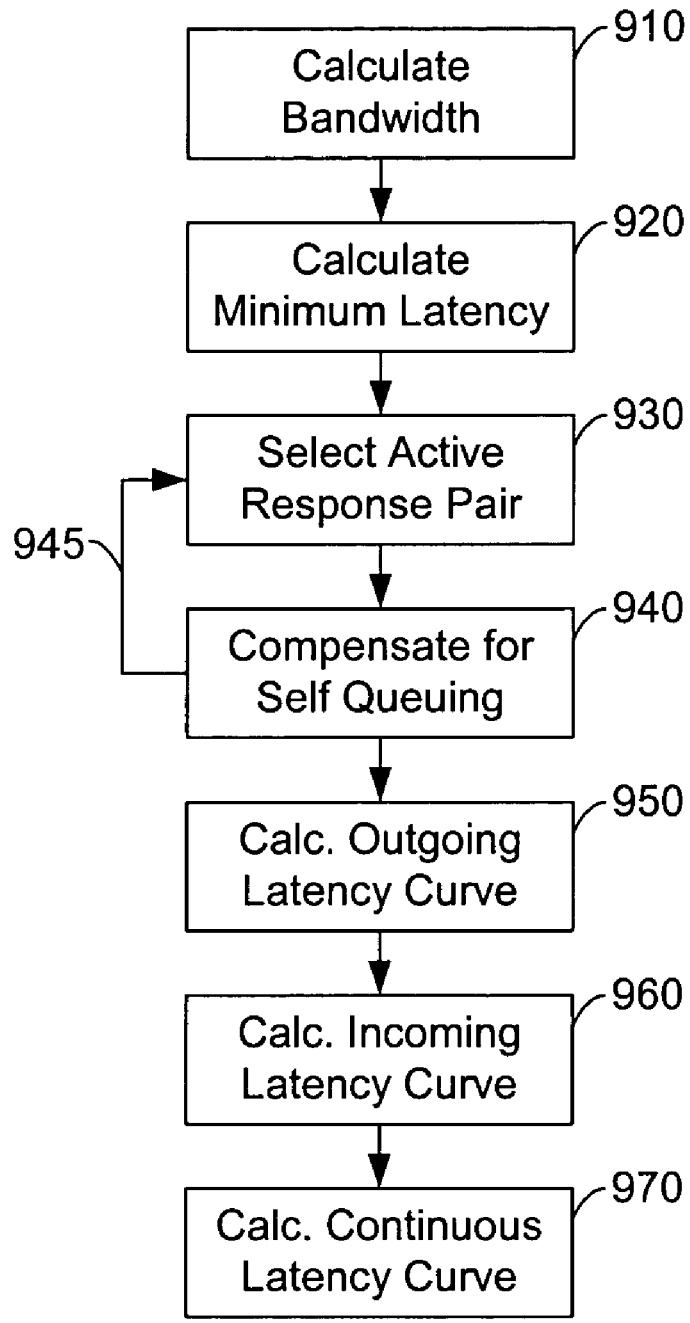
FIG. 9 is a flow diagram of a method of calculating a continuous latency curve.

FIG. 9 shows a method 900 of calculating a continuous latency curve. In one embodiment, the method 900 is implemented by the latency curve generator 522 using active request trace data from the active request log 512 and the response log 518. The method 900 operates on a data set representing active requests and corresponding responses for a particular remote node and period of time. For example, the log data manager 610 may select data from the active request log 512 and the response log 518 for communications with the transaction server 310 over the period of a selected transaction. In an alternate embodiment, the time period may be independent of one or more transactions and correspond to a fixed period, such as 5 minutes. A bandwidth is calculated 910. For example, the bandwidth calculator 612 may calculate a bandwidth value for communications between the host node and a remote node. Further details of calculating a bandwidth value are provided below with regard to FIG. 10. A minimum latency is calculated 920. For example, the minimum latency calculator 614 may calculate the minimum latency from the data set being used for generating the continuous latency curve. An active request/response pair is selected 930. For example, the log data manager 610 may select an active request and identify a corresponding response. Compensation for self-queuing is calculated 940. For example, the self-queuing compensator 616 may calculate a self-queuing delay for the outgoing and incoming portions of the active request/response elapsed time. Compensation for self-queuing is further described below with regard to FIG. 11. The process of selecting 930 active request/response pairs and compensating 940 for self-queuing is repeated 945 for each active request/response pair in the data set. An outgoing latency curve is calculated 950 and an incoming latency curve is calculated 960. For example, the outgoing latency calculator 618 and the incoming latency calculator 620 may calculate latency curves based upon the series of active request/response pairs in the data set. Calculation of a latency curve based upon either the outgoing active requests and the incoming request responses is further described below with regard to FIG. 12. A continuous latency curve is calculated 970. For example, the continuous latency calculator 622 uses the data points in the outgoing and incoming latency curves to generate a single continuous latency curve for network traffic between the host node and remote node. Each of the points in the respective incoming and outgoing latency curves represents a latency value (x axis) and a time (y axis). The points from the incoming and outgoing latency curves are connected serially to create the continuous latency curve. The combined continuous curve is then adjusted for sudden drops. If latency drops from one point to the next by more than a threshold value, such as 50 milliseconds, the points are not connected. The latency value of the second (lower) point is used for all points between the first point and the second point.

Figure 10:
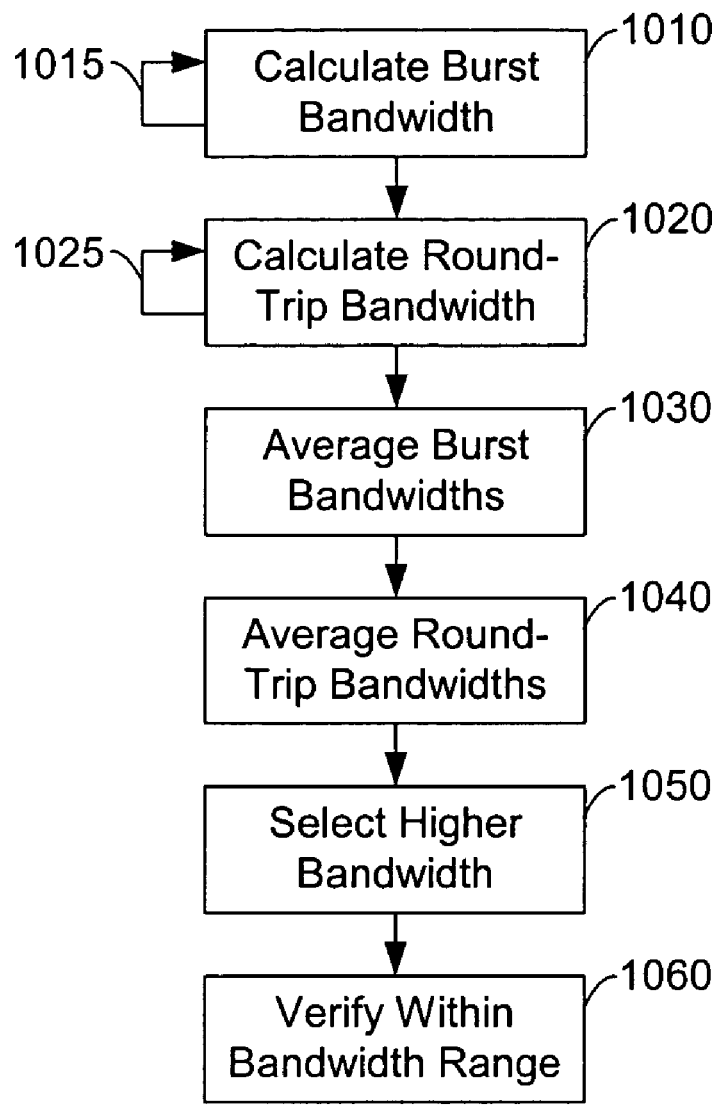
FIG. 10 is a flow diagram of a method of calculating the bandwidth of a host system for use in latency calculations.

FIG. 10 shows a method 1000 of calculating a bandwidth value for use in the self-queuing calculations. In one embodiment, the method 1000 is implemented in the bandwidth calculator 612. A burst bandwidth is calculated 1010. A trace displays a burst bandwidth limitation when the remote node sends packets to the local node faster than the network's bandwidth will allow. The burst bandwidth is calculated by computing the number of bytes received in a given amount of time. For example: 400 byte packet 1 received at time 1.45621 seconds, 1500 byte packet 2 received at time 1.50309 seconds, and 800 byte packet 3 received at time 1.52809. The first packet is a marker received at 1.45621 and the time between packet 1 and packet 3 does not include the bytes for packet 1. The burst bandwidth is equal to: (packet 2 Bytes+packet 3 Bytes)/(packet 3 time−packet 1 time). In the example, (1500+800) Bytes/(1.52809−1.45621) seconds=32000 Bps. This calculation is based upon the packet trace data and, specifically, the size of packet data included therein. The burst bandwidth calculation 1010 is repeated 1015 for each group of three consecutive packets in the data set received from the remote node.

A roundtrip bandwidth is calculated 1020. The roundtrip bandwidth is computed using round trip pairs within the application packet trace data. A round trip is identified using the TCP sequence and acknowledgement numbers. A pair of packets is considered a roundtrip of the TCP sequence number plus the TCP payload size of an outgoing packet is equal to the TCP acknowledgement number and the payload size of the outgoing packet is non-zero. The two packets must also belong to the same TCP connection. To computer the roundtrip bandwidth the roundtrip is compared to some baseline minimum size roundtrip. The formula for bandwidth displayed by a roundtrip is (roundtrip bytes–baseline bytes)/(roundtrip duration–baseline duration). For the baseline duration the smallest roundtrip time recorded in the active request/response pairs in the data set is used. The baseline bytes in the formula can be ignored if the TCP payload bytes of the smallest roundtrip time are used. The overhead is the same between the active latency measurement and the roundtrip being evaluated and the payload size for all active requests/responses is zero. The formula simplifies to: (roundtrip TCP payload size)/(roundtrip duration–smallest detected latency). The roundtrip bandwidth calculation 1020 is repeated 1025 for each roundtrip pair in the corresponding trace data set. In an alternate embodiment, only one of the burst bandwidth or the roundtrip bandwidth may be used. But, because different applications respond better to one bandwidth method than the other, use of both has advantages.

The average burst bandwidth is calculated 1030. For example, the bandwidth calculator 612 may use the calculated burst bandwidths for the data set, or some subset thereof, and calculate an average burst bandwidth. In one embodiment, the highest twenty calculated burst bandwidths are averaged to generate the average burst bandwidth. The average roundtrip bandwidth is calculated 1040. For example, the bandwidth calculator 612 bay use the calculated roundtrip bandwidths for the data set, or some subset thereof, and calculate an average roundtrip bandwidth. In one embodiment, the highest twenty calculated roundtrip bandwidths are averaged to generate the average roundtrip bandwidth. The higher of the average burst bandwidth and the average roundtrip bandwidth is selected 1050. The selected bandwidth is verified 1060 to be within a defined bandwidth range. If the selected bandwidth is not within the defined range, an error is generated. The bandwidth calculator 612 selects the higher of the average burst bandwidth and the average roundtrip bandwidth, verifies whether it is within a predefined range, and provides the selected bandwidth for use by the latency curve generator 522 for further calculations.

Figure 11:
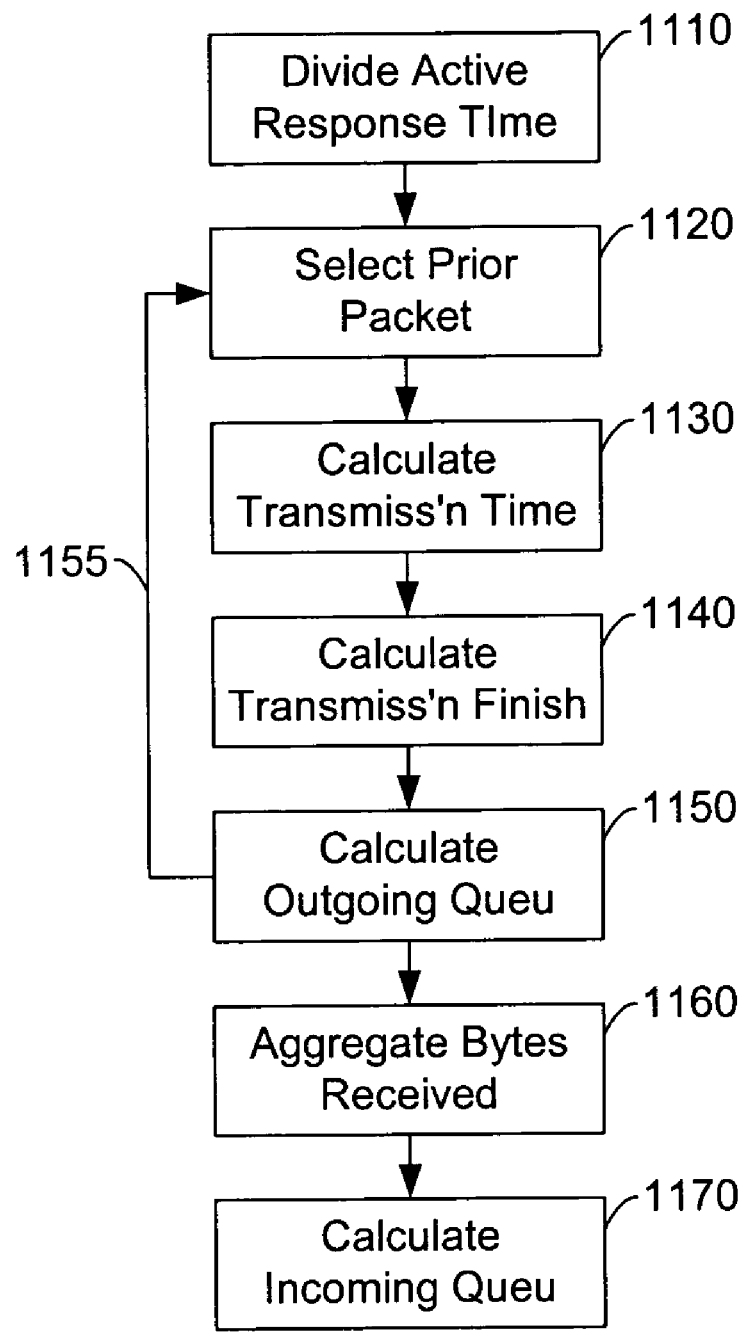
FIG. 11 is a flow diagram of a method of compensating for self-queuing for use in latency calculations.

FIG. 11 shows a method 1100 of compensating for self-queuing for use in latency calculations. In one embodiment, the method 1100 is implemented by the self-queuing compensator 616. Queuing can cause the active latency measurement to increase and should be compensated for to prevent unreliably high latency values. The active response time between an active request/response pair is divided in half 1110. The nature of queuing is unidirectional, but the measurement of latency from the host node takes place in aggregate roundtrip fashion. To adjust for this, the roundtrip latency is split into two halves and used to calculate the effect that the transaction being monitored would have on a link with the bandwidth determined by the bandwidth calculator 612. For each outgoing active request, calculate the total time that all of the preceding outgoing packets (including both application packets and active request packets) would contribute to its transit to the remote node. A prior outgoing packet from period of the data set is selected 1120. For example, the self-queuing compensator 616 selects the trace data for the first packet in the time period of the latency curve calculation. For the selected packet, a transmission time is calculated 1030. For example, the self-queuing compensator 616 may calculate a transmission time by dividing the bytes in the packet by the bandwidth. A transmission finish time is calculated 1040 for the selected packet. For example, the self-queuing compensator 616 calculates the transmission finish time based upon the transmission finish time of the prior packet. If the last transmission finish time is less than the current packet's sent time, the transmission finish time equals the sent time plus the transmission time. Otherwise, the transmission finish time equals the last transmission finish time plus the transmission time. The outgoing queue time is calculated 1050. For example, the self-queuing compensator 616 calculates the outgoing queue time as the transmission finish time minus the roundtrip measurement start time. The selection of prior packets 1020, calculation of transmission time 1030, calculation of transmission finish time 1040, and calculation of outgoing queue 1050 are repeated sequentially for each packet in the data set.

For the incoming queue time, an approximate value is calculated. For each active request/response pair, the incoming queue time equals the amount of time spent on bandwidth for the packets received between the time the response was sent from the remote node and the time the measurement finished. The host node does not know the exact time of the events on the remote node, an approximate value is generated based upon known values. An aggregate bytes received from the remote node is calculated 1160. For example, the self-queuing compensator 616 sums the bytes of packets received between a predicted incoming travel time and the receipt time for the response end time. The predicted incoming travel time equals the send time for the active request plus the minimum latency (calculated by the minimum latency calculator 614) and the outgoing queue calculated above. The incoming queue is calculated 1170. For example, the self-queuing compensator 616 divides the aggregate bytes received by the bandwidth to arrive at an estimated incoming queue time.

Figure 12:
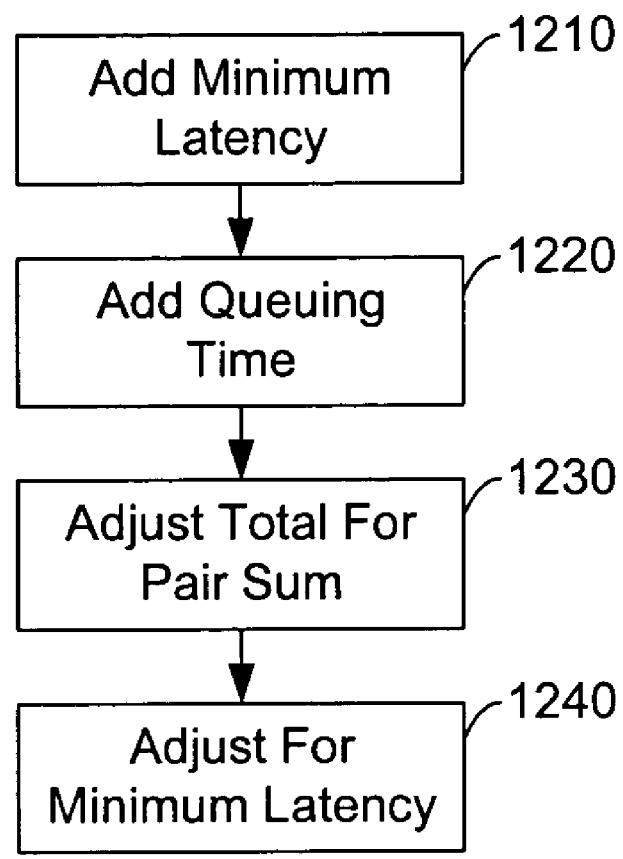
FIG. 12 is a flow diagram of a method of calculating latency data for use in latency calculations.

FIG. 12 shows a method 1200 of calculating latency data for use in latency curve calculations. In one embodiment, the method 1200 is implemented in the outgoing latency calculator 618 and the incoming latency calculator 620. The outgoing latency calculator 618 uses the method 1200 to generate latency data for an outgoing latency curve. The incoming latency calculator 620 uses the method 1200 to generate latency data for an incoming latency curve. Each active request/response pair creates one outgoing latency data point and one incoming latency data point. Each data point includes a time value and a latency value. The time value for the outgoing latency data points is the send time of the active request. The time value for the incoming latency data points is receipt time of the response. Each data point pair is calculated using the method 1200. The minimum latency value is added 1210 to each point. The corresponding queuing time is added 1220 to each point. The outgoing queuing time is added to the outgoing latency data point and the incoming queuing time is added to the incoming latency data point. Each point is adjusted 1230 so that the sum equals the roundtrip time for the active request/response pair. Half of the difference of the sum of both points is either added or subtracted from each point. Each point is adjusted 1240 based upon the minimum latency. If either point is less than the minimum latency, the point with the lower latency value is set to the minimum latency value and the other point is set to the roundtrip time minus the minimum latency value. After all data points in the data set are processed, there should be sufficient incoming and outgoing latency data to assemble latency curves corresponding to the period being monitored (such as a transaction).

Figure 13:
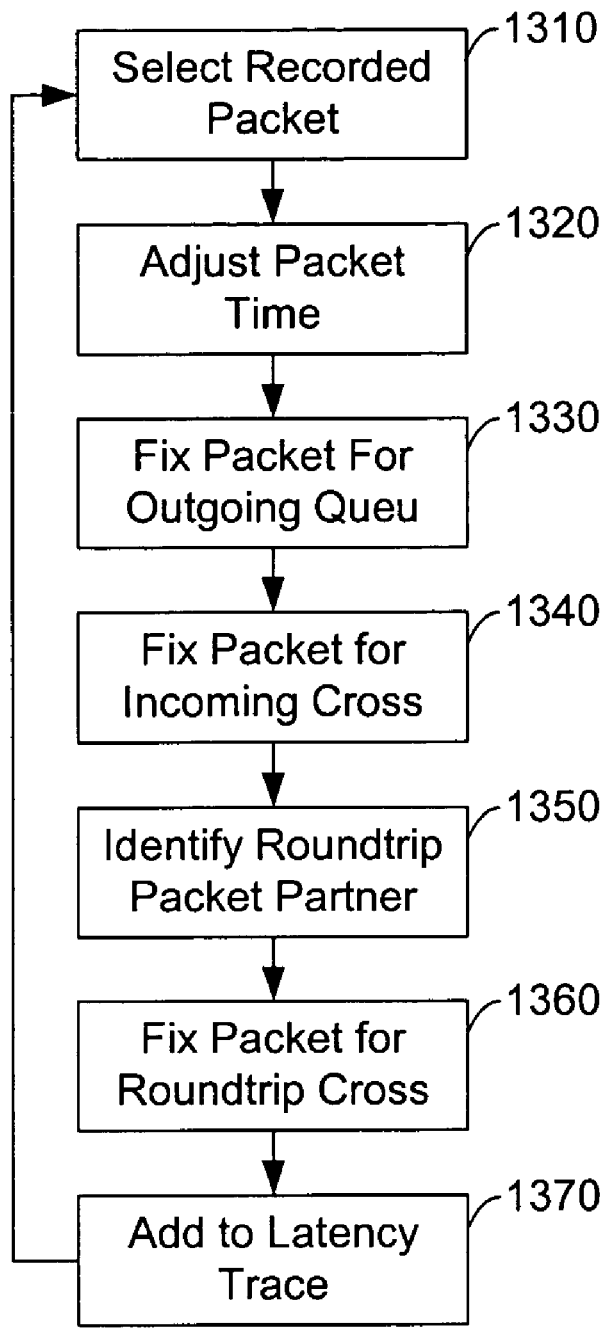
FIG. 13 is a flow diagram of a method of generating a latency trace based upon latency data.

FIG. 13 shows a method 1300 of generating a latency trace based upon latency data and application trace data. In one embodiment, the method 1300 is implemented by the latency trace generation module 430. Generating a latency trace involves adjusting the trace data values for application data packets using corresponding latency data, such as the data from a latency curve. An application packet is selected 1310 from within a trace data set of interest, generally corresponding to a particular period, such as the period of a particular transaction.

Packet times are adjusted 1320 for remote node time. For an incoming packet, the adjustment value is subtracted from the packet's recorded time. The incoming adjustment value is (packet bytes/bandwidth)+(latency value on incoming latency curve corresponding to the packet's recorded time). For an outgoing packet, the adjustment value is added to the packet's recorded time. The outgoing adjustment value is (packet bytes/bandwidth)+(latency value on outgoing latency curve corresponding to the packet's recorded time).

Packets are fixed 1330 for outgoing queuing and crossover effects. For each outgoing packet, calculate the transmission time. Transmission time equals the packet bytes divided by the bandwidth. If the previous packet's received time plus transmission time is greater than the current received time, the current received time is set to the transmission time plus the previous packet's received time. This calculation fixes both outgoing queuing effects and outgoing crossover effects.

Packets are fixed 1340 for incoming crossover effects. Packets that are received first must have been sent first. For incoming packets, the sent time is the remote node time. For each incoming packet, if the current sent time is less than the previous packet's sent time, set the previous packet's sent time to a marginally smaller value than the current packet's sent time. Incoming packets should actually be processed in reverse order of received time.

In order to fix roundtrip crossing, the roundtrip (outgoing and incoming) packet pairs in the application packet data are identified 1350. Roundtrip pairs include two packets where the outgoing packet's TCP payload size plus its TCP sequence number equals a later incoming packet's TCP acknowledgement number. Roundtrip pairs also include two packets where the outgoing packet's TCP acknowledgement number plus its advertised window size is equal to a later incoming packet's TCP sequence number. Both packets must also be part of the same TCP connection and the outgoing packet must be sent before the incoming packet is received. A roundtrip is considered crossed when the incoming packet's sent time is before the outgoing packet's received times. Packets are fixed 1360 for roundtrip cross. A list is assembled of all eligible packets. Packets in the same direction and connection that have identical sequence and acknowledgement numbers or identical acknowledgement and advertised window size are removed after their first occurrence (only the first occurrence remains in the list of eligible packets). Each roundtrip should then be corrected if the outgoing packet's received time is greater than the incoming packet's sent time. To correct, split the difference proportionally to the other packet's bytes. Subtract ((outgoing packet received time−incoming packet sent time)*(incoming packet bytes)/(incoming packet bytes+outgoing packet bytes)) from the outgoing packet received time. If the outgoing packet's return time minus the outgoing packet's sent time is less than the minimum latency, then the outgoing packet's received time is set to the outgoing packet's sent time plus the minimum latency. If the incoming packet's received time minus the outgoing packet's received time is less than the minimum latency, then the outgoing packet's received time is set to a marginally smaller value than the incoming packet's received time minus the minimum latency.

Once packet trace data has been adjusted 1020 and fixed for outgoing queue effects, incoming crossover effects, and roundtrip crosses, they are added 1070 to the latency trace. The various steps of the process are repeated as necessary for all packets in the data set.

Figure 14:
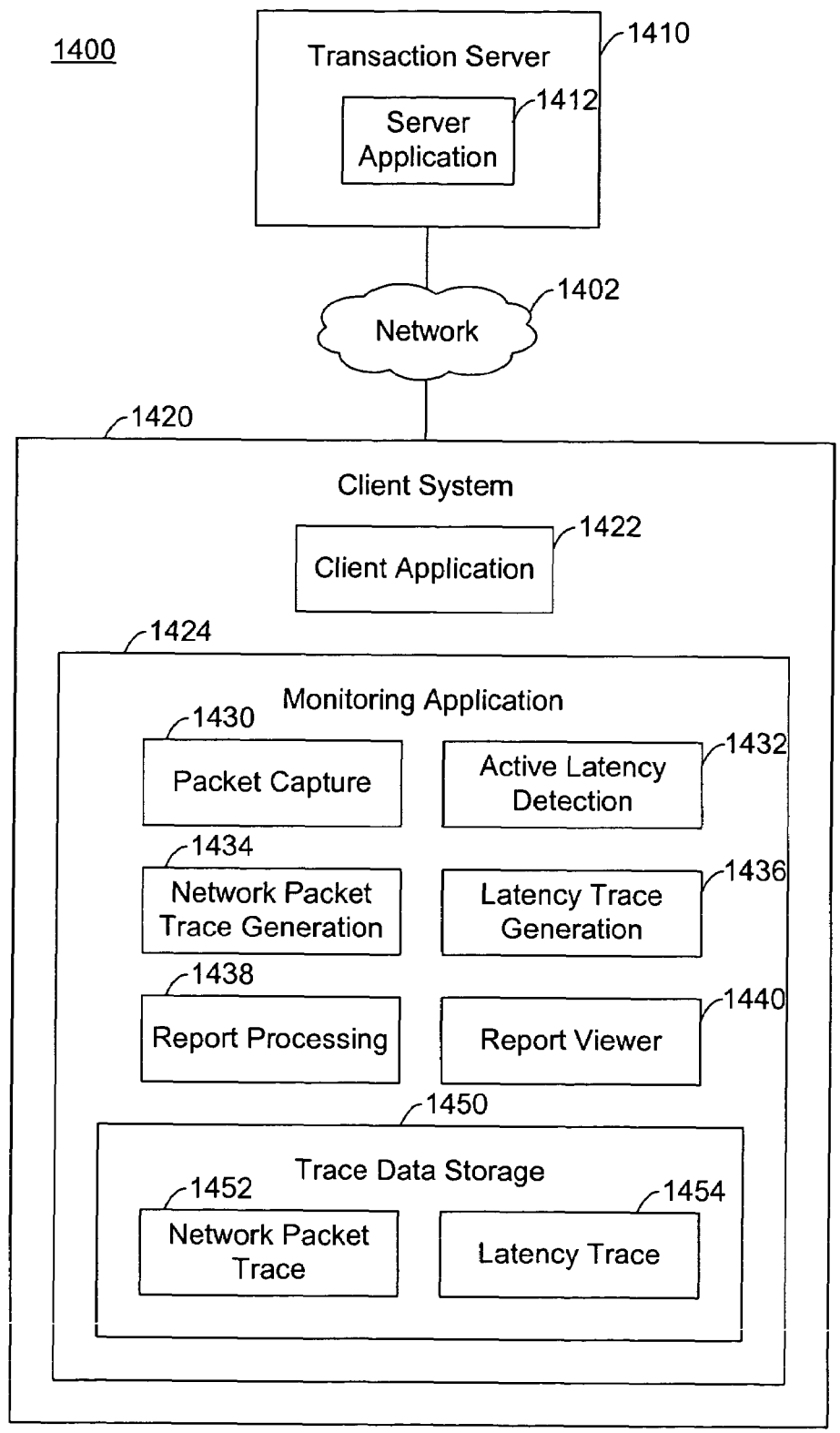
FIG. 14 is a block diagram of an alternate system in which active latency detection is implemented to analyze network application performance.

FIG. 14 shows an alternate system 1400 implementing active latency detection to analyze network application performance. The components of system 1400 operate similarly to the corresponding components of the system 300 shown in FIG. 3 and the details of the active agent module 344 and the agent manager 352 in FIG. 4. In one embodiment, the system 1400 implements the methods 700, 800, 900, 1000, 1100, 1200, and 1300 of FIGS. 7, 8, 9, 10, 11, 12, and 13. The system 1400 is a single host system that integrates the functions of the agents, monitoring system, and viewer system into a single application or suite. The system 1400 implements a passive agent monitoring scheme and does not actually generate synthetic transactions to monitor, instead monitoring actual transactions completed through it. In an alternate embodiment (not shown), a similarly integrated system may implement an active agent monitoring scheme.

The system 1400 includes a transaction server 1410 with a server application 1412 that is in communication with a client system 1420 with a client application 1422. The transaction server 1410, server application 1412, client system 1420, and client application 1422 are similar to the transaction server 310, server application 312, client systems 320, 330, and 340, and the client applications 332 and 342 of FIG. 3. The transaction server 1410 and the client system 1420 communicate over a network 1402, similar to the network 302 of FIG. 3.

The functional components for monitoring packet traffic between the transaction server 1410 and the client system 1420 are embodied in a monitoring application 1424. The monitoring application 1424 includes a packet capture module 1430, an active latency detection module 1432, a network packet trace generation module 1434, a latency trace generation module 1436, a report processing module 1438, a report viewing module 1440, and a trace data storage module 1450. The trace data storage module 1450 includes a network packet trace data module 1452 and a latency trace data module 1454. The packet capture module 1430 and the active latency detection module 1432 function similarly to the packet capture module 412 and the active latency detection module 414 as shown and described in FIGS. 4 and 5. The network packet trace generation module 1434 and the latency trace generation module 1436 function similarly to the network packet trace generation module 428 and the latency trace generation module 430 as shown and described in FIGS. 4 and 6. The report processing module 1438 and the report viewer module 1440 function similarly to the report processing module 454 of FIG. 4 and the report viewer modules 354 and 362 of FIG. 3. The trace data storage module 1450 functions similarly to the trace data storage module 426 of FIG. 4. Network packet trace data module 1452 includes data similar to that communicated in the network packet trace 440 and the latency trace data module 1454 includes data similar to that communicated in the latency trace 442 in FIG. 4. The trace data storage module 1450 stores locally the data provided to the agent manager 352 in the system 300. The report processing module 1438 and the report viewer 1440 act upon the locally generated and stored data, rather than aggregating data from other sources. In an alternate embodiment (not shown), the monitoring application 1424 also includes communication modules to allow remote applications to access or receive trace data for aggregation and viewing.

The invention claimed is:

1. A computer system for calculating latency of a network, comprising:
   a single active agent configured to transmit requests and receive responses to the requests to generate a single trace file, the single active agent further comprising:
      an active request generator that generates periodic requests to an identified closed port at a remote network node;
      an active request log that stores request timing information regarding the timing of the periodic requests generated by the active request generator;
      a response handler that receives responses from the node;
      a response log that stores response timing information regarding the timing of the responses received by the response handler; and
      a latency curve generator that calculates a continuous latency curve based upon the request timing information and the response timing information.

2. The computer system of claim 1, further comprising a request decay controller that regulates a wait period between the periodic requests by the active request generator based upon receipt of application packets associated with the node.

3. The computer system of claim 1, further comprising an active response filter that identifies responses corresponding to the periodic requests by the active request generator and directs other packets for further handling.

4. The computer system of claim 1, further comprising a node data manager that identifies a plurality of nodes on the network and directs handling by the active request generator, the response handler, and the latency curve generator for each of the plurality of nodes.

5. The computer system of claim 1, further comprising:
   an outgoing latency calculator that calculates an outgoing latency of periodic requests by the active request generator;
   an incoming latency calculator that calculates an incoming latency of responses received by the response handler; and
   a continuous latency calculator that calculates the latency curve based upon the outgoing latency and the incoming latency.

6. The computer system of claim 5, further comprising a self-queuing compensator that adjusts the outgoing latency and the incoming latency for self-queuing.

7. The computer system of claim 5, further comprising a bandwidth calculator that calculates an outgoing bandwidth used in calculating the outgoing latency and an incoming bandwidth used in calculating the incoming latency.

8. The computer system of claim 5, further comprising a minimum latency calculator that calculates a minimum latency used for calculating the latency curve.

9. A computer system for calculating latency from transmit times of individual packets of a network application comprising:
   an active latency detection module within a single network node, the active latency detection module configured to calculate latency data based upon periodic requests to an identified closed port at a remote network node that are denied by the remote network node;
   a packet capture module that receives within the single network node, the packet capture module configured to receive application data packets from the network node related to the network application;
   a trace data storage module that stores network application trace data based upon the application data packets received by the packet capture module; and
   a latency trace generation module that calculates continuous latency of the network application based upon the latency data calculated by the active latency detection module and the network application trace data stored by the trace data storage module.

10. The computer system of claim 9, wherein the latency data includes a latency curve calculated by the active latency detection module.

11. The computer system of claim 9, wherein the periodic requests by the active latency detection module are directed to an identified closed port.

12. The computer system of claim 9, wherein the active latency detection module decays a rate for the periodic requests based upon the receipt of application data packets from the network node.

13. The computer system of claim 9, wherein the active latency detection module and the packet capture module handle latency data and application data packets for a plurality of network nodes.

14. The computer system of claim 9, further comprising a network packet trace generation module that generates a network packet trace without latency correction based upon the network application trace data.

15. The computer system of claim 9, further comprising a transaction generation module that generates application requests to the network node and the application data packets received by the packet capture module include application data packets responsive to the application requests.

16. The computer system of claim 9, further comprising:
   a report processing module for generating latency trace reports based upon latency trace data generated by the latency trace generation module; and
   a report viewer module for displaying latency trace reports to a user.

17. A method of calculating network latency comprising:
   generating in a single network node periodic requests to an identified closed port at a remote network node, the periodic requests having low remote processing times;
   recording in the single network node timing information for the periodic requests;
   receiving at the single network node responses corresponding to the periodic requests;
   recording in the single network node timing information for the received responses;
   calculating in the single network node latency data for the network based upon the timing information for the periodic requests and the timing information for the received application data packets; and
   calculating in the single network node a continuous latency curve based upon the calculated latency data for the network.

18. The method of claim 17, wherein a delay between the periodic requests is based upon a rate and further comprising decaying the rate based upon non-receipt of application data packets from the network node.

19. The method of claim 17, further comprising:
receiving application data packets and responses corresponding to the periodic requests in a data stream from the network node;
removing responses corresponding to the periodic requests; and
directing the application data packets for further processing.

20. The method of claim 17, further comprising correcting the latency data for self-queuing delays.

21. The method of claim 17, further comprising:
receiving application data packets from the network node;
recording timing information for the application data packets; and
calculating a latency trace for an application associated with the application data packets based upon the timing information for the application data packets and the latency data.

22. A method of calculating network latency, comprising:
aggregating timing data from periodic requests to an identified closed port at a remote network node;
calculating at a single network node outgoing latencies for the periodic requests;
calculating at the single network node incoming latencies for the periodic requests; and
generating at the single network node a continuous latency curve based upon the calculated outgoing latencies and incoming latencies.

23. The method of claim 22, wherein calculation of outgoing latencies and calculation of incoming latencies includes compensation for self-queuing.

24. The method of claim 22, further comprising calculating a bandwidth for a host system, the bandwidth used in calculating the outgoing latencies and calculating the incoming latencies.

25. The method of claim 22, further comprising calculating a minimum latency for communications with the network node, the minimum latency used in calculating outgoing latencies and calculating incoming latencies.

26. The method of claim 22, further comprising:
aggregating timing data for application data packets directed to and from the network node; and
calculating a latency trace based upon the timing data for the application data packets and the continuous latency curve.

* * * * *